Sept. 20, 1949.  J. W. WELLS  2,482,449
BELLEVILLE SPRING ASSEMBLY
Filed Aug. 12, 1944
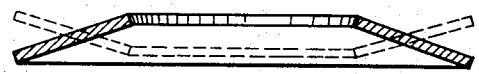
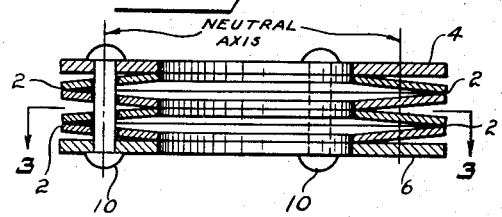
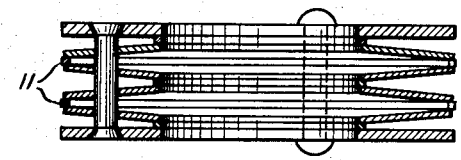
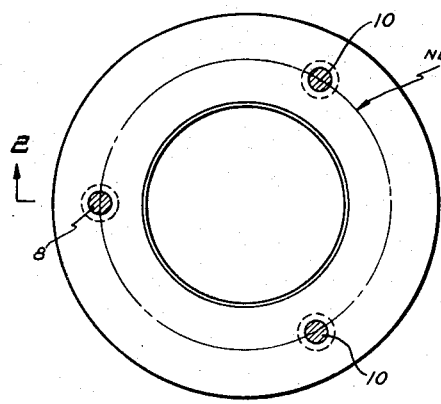
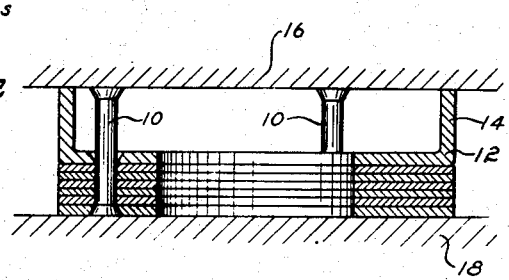
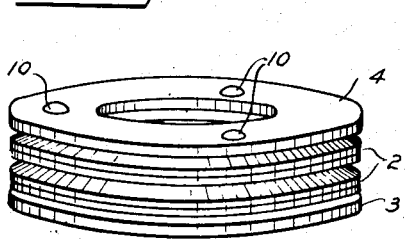
Inventor
JOSEPH W. WELLS
By Scrivener & Parker
Attorneys Patented Sept. 20, 1949

2,482,449

UNITED STATES PATENT OFFICE 2,482,449

BELLEVILLE SPRING ASSEMBLY

Joseph W. Wells, Bristol, Conn., assignor to Associated Spring Corporation, Bristol, Conn., a corporation of Delaware Application August 12, 1944, Serial No. 549,186

7 Claims. (Cl. 267—1)

This invention relates to springs and more particularly to those of the well-known Belleville type.

It is a common practice to assemble Belleville springs into a pile in order to utilize the assembly as a single spring. In order to take full advantage of the characteristics of these springs it is necessary to assemble them in different ways for different uses and functions. Thus, for certain purposes the springs are assembled in series, i. e. adjacent springs are inverted with respect to each other in their unstressed condition, while for other purposes they are assembled in parallel, in which condition the springs are parallel in all conditions of stress. Further, in either series or parallel assemblies adjacent springs may be separated by spacers in order to permit them to be deflected beyond the horizontal.

Heretofore it has been the practice to assemble the springs either on a rod passing through and fitting their aligned central openings, or within a recess closely surrounding their aligned external peripheries, or by means of an annular clamp connecting the abutting inner or outer peripheries of adjacent springs. These known methods of assembly have been found to be so unsatisfactory that Belleville assemblies have not been as widely used as the advantages of such springs would appear to warrant.

It is therefore the principal object of this invention to provide a new Belleville spring assembly which is not subject to the disadvantages of known assemblies and methods of assembling. The invention is also useful in the attachment of a single Belleville spring to a mechanism or part, and object of the invention is to provide a new and improved means of effecting such an attachment.

Certain embodiments of the invention are disclosed in the accompanying drawings in which Fig. 1 is a sectional view of a Belleville spring in both stressed and unstressed conditions;

Fig. 2 is a sectional view of an assembly of Belleville springs formed and assembled in accordance with this invention, such section being taken on line 2—2 of Fig. 3;

Fig. 3 is a sectional view taken on line 3—3 of Fig. 2;

Fig. 4 is a view similar to Fig. 2 and showing a modified form of the invention;

Fig. 5 illustrates a further modification of the invention, and

Fig. 6 is a perspective view of a Belleville assembly according to the invention.

In the operation, or deflection, of a Belleville spring it moves from the frusto-conical shape which it has when unstressed, through a "horizontal" condition in which it lies in a single plane, to an inverted frusto-conical shape. During this movement each radial section of the spring rotates about a point near its center, as illustrated in Fig. 1. The locus of these axes of rotation is an annular section approximately midway between the inner and outer peripheries of the spring, which is sometimes referred to as the neutral axis of the spring.

In accordance with this invention superposed Belleville springs are attached by means passing through or near the neutral axis. Such an assembly is disclosed in Figs. 2 and 6 and comprises superposed Belleville springs 2, which in this embodiment are arranged in series, and end plates 4, 6 which are positioned respectively at the top and bottom of the pile of springs. Each of the springs and end plates is provided with a plurality of openings 8 which are so arranged that pins or rivets 10 extending therethrough will lie in or near the neutral axis, or axis of rotation, of the springs. Preferably three equally spaced circular openings are formed in each spring and plate and pins of slightly less diameter than the openings are passed therethrough. These pins are of such length that heads formed on the opposite ends thereof will engage the outer faces of the end plates, thus limiting the expansion of the spring assembly. The springs may be assembled in their unstressed condition or may be initially stressed.

If desired, spacers may be positioned between the normally abutting parts of adjacent springs in order to permit the springs to be deflected beyond the horizontal, or co-planar, condition. Fig. 4 illustrates a Belleville assembly including spacers 11.

One or both of the end plates 4, 6 may be provided with projecting parts which may be engaged to cause deflection of the springs. Such an arrangement is illustrated in Fig. 5, in which the end plate 12 is provided with one or more projecting parts 14 which normally extend outwardly beyond the connecting pins 10 and which may be engaged by one of two parts 16, 18 which are movable toward each other whereby the springs 2 are deflected. It will be seen that in the example illustrated in Fig. 5 no spacers are provided and the springs are deflected only to the horizontal condition. If desired, spacers may of course be provided.

By reason of the connection of the members of an assembly of Belleville springs by means passing through or near the neutral axis, or axis of rotation, of the various members, numerous advantages over known assemblies and methods of connection are provided which will be apparent to those skilled in the art. The invention may of course be applied to spring assemblies of either the series or parallel type, or to assemblies in which series and parallel arranged springs are combined. It may also be utilized in attaching a single Belleville spring to a mechanism or part.

Throughout this specification and in the appended claims the term "Belleville spring," which is a well-known term in the spring art, refers to a conical spring such as is described and claimed in the U. S. patent to Belleville No. 65,790. In deflecting, each radial cross-section of such a spring rotates about a point located between the inner and outer peripheries of the spring. The annular locus of these points is described in this specification and the appended claims as the "neutral axis," which is also a well-known term in the spring art.

While I have described and illustrated certain forms which my invention may take it will be apparent to those skilled in the art that other forms and embodiments may be made, as well as modifications of those disclosed, all without departing in any way from the scope of the invention, for the limits of which reference must be had to the appended claims.

What I claim is:

1. A spring device comprising a plurality of superposed Belleville springs connected together by means passing substantially through the neutral axis of each spring.

2. A spring device comprising a plurality of superposed Belleville springs connected together by a plurality of pins each of which passes substantially through the neutral axis of each spring.

3. A spring device comprising a plurality of superposed Belleville springs, end plates at the top and bottom of said assembly of superposed springs, and means connecting said plates and passing substantially through the neutral axis of each spring.

4. A spring device comprising a plurality of superposed Belleville springs, end plates at the top and bottom of said assembly of superposed springs, and a plurality of pins connecting said plates and passing substantially through the neutral axis of each spring.

5. A spring device comprising a plurality of superposed Belleville springs, end plates at the top and bottom of said assembly of superposed springs, and means connecting said plates and passing substantially through the neutral axis of each spring and permitting movement of said plates toward each other.

6. A spring device comprising a plurality of superposed Belleville springs, end plates at the top and bottom of said assembly of superposed springs, and a plurality of devices connecting said plates and passing substantially through the neutral axis of each spring and permitting movement of said plates toward each other.

7. A spring device comprising a plurality of superposed Belleville springs, end plates at the top and bottom of said assembly of superposed springs, and a plurality of pins connecting said plates and passing substantially through the neutral axis of each spring and permitting movement of said plates toward each other.

JOSEPH W. WELLS.

REFERENCES CITED

The following references are of record in the file of this patent:

UNITED STATES PATENTS

| Number | Name | Date |
| --- | --- | --- |
| 59,384 | Glidden | Nov. 6, 1866 |
| 78,191 | Daniels | May 26, 1868 |
| 1,818,362 | Symington | Aug. 11, 1931 |
| 1,939,286 | Spencer | Dec. 12, 1933 |
| 2,169,787 | Becker | Aug. 15, 1939 |
| 2,263,107 | Smirl | Nov. 18, 1941 |
| 2,325,193 | Nutt et al. | July 27, 1943 |